(12) United States Patent
Kim et al.

(10) Patent No.: US 11,615,423 B2
(45) Date of Patent: *Mar. 28, 2023

(54) CUSTOMER COMMUNICATION SYSTEM INCLUDING SERVICE PIPELINE

(71) Applicant: UJET, Inc., San Francisco, CA (US)

(72) Inventors: Hisun Kim, San Francisco, CA (US); Anand Janefalkar, San Francisco, CA (US)

(73) Assignee: UJET Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,313

(22) Filed: Apr. 28, 2021

(65) Prior Publication Data

US 2021/0248619 A1 Aug. 12, 2021

Related U.S. Application Data

(63) Continuation of application No. 16/138,654, filed on Sep. 21, 2018, now Pat. No. 11,087,332, which is a
(Continued)

(51) Int. Cl.
*H04L 9/40* (2022.01)
*H04W 12/06* (2021.01)
(Continued)

(52) U.S. Cl.
CPC ........... *G06Q 30/016* (2013.01); *G06F 21/31* (2013.01); *H04L 63/0861* (2013.01);
(Continued)

(58) Field of Classification Search
CPC .............. G06Q 30/016; G06Q 30/0281; G06F 21/31; H04L 63/0861; H04L 63/108;
(Continued)

(56) References Cited

U.S. PATENT DOCUMENTS

| 8,732,258 B2 * | 5/2014 | Seminaro .............. H04L 67/025 726/5 |
| 2004/0078603 A1 | 4/2004 | Ogura et al. |
| 2005/0039057 A1 | 2/2005 | Bagga et al. |
| 2013/0244632 A1 | 9/2013 | Spence et al. |
| 2014/0074507 A1 * | 3/2014 | Simon ................ G06Q 30/0269 705/3 |

FOREIGN PATENT DOCUMENTS

| CN | 1555535 A | 12/2004 |
| CN | 1980243 A | 6/2007 |

(Continued)

OTHER PUBLICATIONS

CN2016800533817, Second Office Action Response filed Nov. 4, 2021.
(Continued)

*Primary Examiner* — Beemnet W Dada
(74) *Attorney, Agent, or Firm* — Rimon Law, P.C.

(57) ABSTRACT

A system for automatic authentication of service requests includes authentication of a remote access device. This authentication may be accomplished automatically prior to text or audio communication between a customer and a service agent. In some embodiments, authentication is accomplished automatically by authentication of the remote access device or accomplished by asking the customer questions. A single authentication of the remote access device may be used to authenticate a service request transferred between service agents. The authentication of the remote device may include, for example, use of a personal identification number, a fingerprint, a photograph, and/or a hardware identifier. Some embodiments include an intelligent pipeline configured for managing queues of customer service requests.

19 Claims, 5 Drawing Sheets

Related U.S. Application Data continuation of application No. 14/850,142, filed on Sep. 10, 2015, now Pat. No. 10,108,965, which is a continuation-in-part of application No. 14/831,129, filed on Aug. 20, 2015, now Pat. No. 9,838,533, and a continuation-in-part of application No. 14/798,468, filed on Jul. 14, 2015, now Pat. No. 11,228,906.

(51) Int. Cl.
*H04W 12/04* (2021.01)
*G06F 21/31* (2013.01)
*G06Q 30/016* (2023.01)
*H04M 3/51* (2006.01)
*H04M 3/523* (2006.01)
*H04W 12/71* (2021.01)

(52) U.S. Cl.
CPC ........ *H04L 63/108* (2013.01); *H04M 3/5133* (2013.01); *H04M 3/5232* (2013.01); *H04W 12/04* (2013.01); *H04W 12/06* (2013.01); *H04M 3/5231* (2013.01); *H04M 3/5237* (2013.01); *H04M 3/5238* (2013.01); *H04M 2203/6045* (2013.01); *H04M 2203/6072* (2013.01); *H04W 12/71* (2021.01)

(58) Field of Classification Search
CPC ............. H04M 3/5133; H04M 3/5232; H04M 3/5231; H04M 3/5237; H04M 3/5238; H04M 2203/6045; H04M 2203/6072; H04W 12/04; H04W 12/06; H04W 12/71
See application file for complete search history.

(56) References Cited

FOREIGN PATENT DOCUMENTS

| | | |
|---|---|---|
| CN | 103380430 A | 10/2013 |
| CN | 104335214 A | 2/2015 |
| JP | 10-116307 A | 5/1998 |
| JP | 2005-245022 A | 9/2005 |
| JP | 2010-050938 A | 3/2010 |
| JP | 2010-200265 A | 9/2010 |
| JP | 2011-146829 A | 7/2011 |
| KR | 10-2002-0072929 A | 9/2002 |
| WO | 98/44714 A1 | 10/1998 |

OTHER PUBLICATIONS

CN2016800533817, Third Office Action dated Jan. 7, 2022 and translation.
CN2016800533817, Third Office Action Response filed Mar. 22, 2022 and translation.
KR10-2020-7022721, Notice of Grounds for Rejection dated Oct. 29, 2021.
KR10-2020-7022721, Argument to Notice of Grounds for Rejection dated Oct. 29, 2021, filed Dec. 20, 2021.
CN2016800533817, Office Action Response filed May 14, 2021 and translation.
CN2016800533817, Second Office Action dated Aug. 23, 2021 and translation.
Office Action issued in related Japanese Patent Application No. 2021-116286 dated Aug. 16, 2022, 13 pages.
Reexamination Request in related Chinese Patent Application No. 2016800533817 filed on Jul. 20, 2022.
4th Office Action in related Chinese Patent Application No. 2016800533817 dated Oct. 31, 2022.

* cited by examiner

CUSTOMER COMMUNICATION SYSTEM INCLUDING SERVICE PIPELINE

CROSS-REFERENCE TO RELATED APPLICATIONS

This application is a continuation of non-provisional patent application Ser. No. 16/138,654 filed on Sep. 21, 2018 which is a continuation of non-provisional patent application Ser. No. 14/850,142 filed on Sep. 10, 2015, now U.S. Pat. No. 10,108,965 issued Oct. 23, 2018, which is a continuation-in-part of non-provisional patent application Ser. No. 14/798,468 filed on Jul. 14, 2015 and also a continuation-in-part of non-provisional patent application Ser. No. 14/831,129 filed on Aug. 20, 2015, now U.S. Pat. No. 9,838,533 issued Dec. 5, 2017. The disclosures of these applications are hereby incorporated herein by reference.

BACKGROUND

Field of the Invention

The invention is in the field of customer management and more specifically related to customer authentication.

Related Art

Customer service is often provided by phone calls in which a customer calls a call center. A first step in such a call is typically to authenticate the caller. When the caller is passed from one service provider to another, the authentication often must be repeated. Customers and call center staff have become accustom to this process.

SUMMARY

The process of authenticating a caller is facilitated using capabilities of a client device. In some embodiments, the authentication of the caller is achieved by automatically authenticating the client device. The authentication of the client device is optionally accomplished by communicating data stored or entered on the client device. This data may include personal identification numbers, passwords, biometric data, and/or the like. The authentication processes can be applied to text, voice and/or video communication between a customer and a customer service agent.

Various embodiments of the invention include a customer communication system comprising: a gatekeeper configured to receive digital identification data and to ratify the digital identification data by comparing the digital identification data to previously stored customer authentication data; and a customer relationship management system configured to receive a customer service request from an access device and to connect the customer service request to an agent interface, the customer relationship management system including authentication logic configured to authenticate a source of the customer service request using at least two methods, the two methods including: a) providing questions to the agent interface and ratifying responses to the questions and b) providing digital identification data received from the source of the customer service request to the gatekeeper and receiving an automated ratification of the digital identification data from the gatekeeper, the customer relationship management system being further configured to provide secure customer data to the agent interface only after the authentication of the source of the customer service request.

Various embodiments of the invention include an access device comprising: a display; a user input; an input/output configured to initiate communication to a customer relationship management system; an authentication agent configured to receive an authentication request from a customer relationship management system and to automatically provide digital identification data to a gatekeeper in response to the authentication request, wherein the authentication request includes an identifier of the customer relationship management system; an access control configured to limit access via the display to the authentication agent; and a processor configured to execute at least the authentication agent.

Various embodiments of the invention include a method of managing a customer service request, the method comprising: receiving the customer service request from a remote access device; automatically sending an authentication request to the access device; receiving digital identification data from the access device in response to the authentication request; providing the digital identification data to a gatekeeper; receiving from the gatekeeper a ratification of the digital identification data; providing permission to discuss or access secure customer data, the permission being provided to an agent interface in response to receiving the ratification, the agent interface being configured for audio, text or video communication between a customer support agent and the access device.

Various embodiments of the invention include a customer relationship management system comprising authentication logic configured to automatically authenticate a source of a customer service request using digital identification data received from the source of the customer service request; and pipeline logic including: agent assignment logic configured to assign a customer service agent to a request pipeline, sorting logic configured to place the customer service request into the request pipeline, and ordering logic configured to maintain an order of customer service requests in the request pipeline.

Various embodiments of the invention include a method of processing a customer service request, the method comprising: receiving a customer service request; authenticating a source of the customer service request; selecting a request pipeline for placement of the customer service request in a request pipeline, the selection being based on the authentication of the source; selecting an advertisement based on the authentication of the source; and providing the service requested in the customer service, provision of the service being based on information only available because the source is authenticated.

DETAILED DESCRIPTION

Customer Relationship Management (CRM) is improved through use of various embodiments of the invention. For example, authentication of the identity of a customer may be automated as an alternative to or in addition to manual authentication by a human customer service agent. The automated authentication typically increases the speed and/or security of the authentication process. As used herein, the phrase "automatic authentication" is an authentication that is performed by a computer and/or communication device without necessarily requiring actions by a customer service agent. In contrast, "manual authentication" is used to refer to authentication that is performed by a service agent, for example, by asking the customer specific questions. Both automatic and manual authentication can include some action performed by the customer, such as entering a Personal Identification Number (PIN) or providing a fingerprint.

Figure 1:
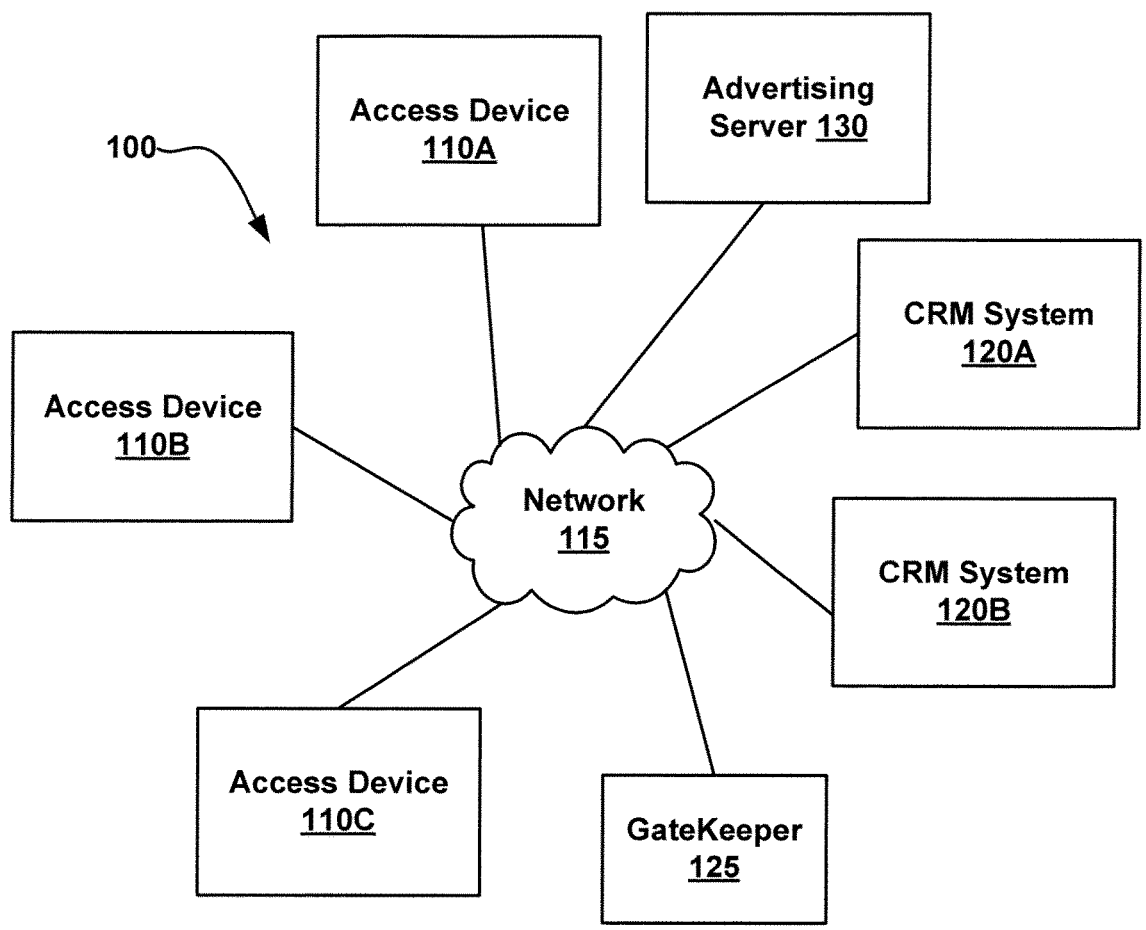
FIG. 1 illustrates a customer communication system, according to various embodiments of the invention.

FIG. 1 illustrates a Customer Communication System 100, according to various embodiments of the invention. Customer Communication System 100 includes one or more Access Devices 110, (individually labeled 110A, 110B, 110C, etc.). The Access Devices 110 are configured to communicate via a Network 115 with one or more Customer Relationship Management (CRM) Systems 120, (individually labeled 120A, 120B, etc.). Network 115 may be a telephone network, a computer network (e.g., the internet), and/or some other communication network. The communication includes digital data and also optionally analog audio and/or image data. CRM Systems 120 may include features common to traditional CRM systems available from companies such as Salesforce or Zendesk. However, as described further herein, CRM Systems 120 includes additional unique features. In some embodiments, CRM Systems 120 are configured to operate as an interface/shell on top of a traditional CRM system.

A single customer may be associated with more than one of Access Devices 110. For example, the customer may have a phone, a tablet and a personal computer through which they access CRM Systems 120. These devices may be used to interact with different CRM Systems 120 associated with different enterprises.

Customer Communication System 100 further includes one or more GateKeeper 125. GateKeeper 125 is configured to control (e.g., grant) access to information and resources by ratifying the authenticity of digital identification data. GateKeeper 125 is optionally an integral part of CRM System 120A. However, GateKeeper 125 is illustrated as being separate from CRM System 120A because, in some embodiments, GateKeeper 125 is configured to support multiple CRM Systems 120. For example, in some embodiments, each of CRM Systems 120 includes its own integrated GateKeeper 125.

In typical embodiments, GateKeeper 125 is specifically configured to grant access to secure customer data and/or to grant permission to use the secure customer data. This access is granted to customer service agents at members of CRM Systems 120 and/or to the consumer associated with the customer data. For example, a human customer service agent may only be granted access to secure customer data after the customer and/or customer's Access Device 110A is authenticated. Or, the human customer service agent may have access to the secure customer data and only be granted permission to discuss the secure customer data (with the customer) if the customer and/or customer's Access Device 110A is authenticated. GateKeeper 125 includes logic configured to perform the actions described herein. This logic is embodied in hardware, firmware, and/or software stored on a non-transient computer readable medium. In some embodiments, Gatekeeper 125 includes a microprocessor configured to execute specific computing instructions for ratifying the digital identification data.

Gatekeeper 125 is configured to facilitate authentication of a customer and/or customer's Access Device 110A by automatically comparing digital identification data received at the time of authentication to previously stored customer authentication data. The previously stored customer authentication data is typically provided to Gatekeeper 125 as part of an account establishment or update. The previously stored customer authentication data is optionally received from a source that is automatically or manually authenticated separately. For example, a customer using Access Device 110A may be manually authenticated at the start of a communication session and then the customer authentication data may be received from Access Device 110A during the same communication session. If the digital identification data matches the stored customer authentication data, the digital identification data is considered to be "ratified." A request for ratification of digital identification data is referred to herein as a "ratification request." For example, a ratification request may include sending the digital identification data to GateKeeper 125. A ratification request is distinguished from an "authentication request" which is a request made to an access device for digital identification data.

In various embodiments, the previously stored customer authentication data represents: biometric data, a password, a personal identification number (PIN), fingerprint data, facial data, a rolling code generator, image data, networking data, a mobile equipment identifier (e.g., International Mobile Equipment Identity (IMEI) number or Mobile Equipment ID (MEID), a mobile phone number, a MAC address, an internet protocol address, an Ethernet address), location data, and/or the like, or any combination thereof. The comparison made by Gatekeeper 125 between the received digital identification data and the previously stored customer authentication data may involve multiple factors. For example, the authentication may be a multi-factor authentication using both a MAC address and a fingerprint; or using both a fingerprint and a location.

In some embodiments the role of GateKeeper 125 in authentication of members of Access Devices 110 is limited to ratification of digital identification data and reporting this ratification to authentication logic (discussed elsewhere herein). However, in other embodiments, GateKeeper 125 is configured to have more direct control over access to secure customer data.

GateKeeper 125 may use a variety of approaches for controlling access to secure customer data. In some embodiments, GateKeeper 125 is configured to communicate specific data access keys to CRM Systems 120 in response to successful ratification requests. In these embodiments, the data access keys are used to access and/or decrypt customer data on the CRM Systems 120. The data access keys are optionally configured to be temporary such that they provide access during just one communication session. In some embodiments, Gatekeeper 125 is configured to function as a bridge between part of CRM System 120A and secure customer data. In these embodiments, GateKeeper 125 may be configured to directly block or allow requests to access the secure customer data from CRM System 120A. For example, Gatekeeper 125 may be configured to allow different types of queries on a database (of customer data) as a function of the level of authentication that has been achieved. Queries may be parsed or filtered to determine if they should be allowed. For example, a query to customer data for a customer using Access Device 110A may be allowed after Access Device 110A is successfully authenticated, while a query (optionally from the same source) to customer data for a different customer may be denied. The database and database management logic are optionally included on Gatekeeper 125, or on CRM System 120A.

In another approach, Gatekeeper 125 controls access to secure customer data using Network Access Control (NAC). NAC uses the configuration of access points, such as firewalls, switches or routers to control access to resources within a protected network. Typically, access to resources including secured customer data is only granted (from CRM Systems 120) after authentication of a member of Access Devices 110 or of a customer. The granted access may be temporary and may be granted only to a particular customer service agent interface, e.g., access may be granted or denied on the granularity of a particular device hosting a customer service agent interface. This (NAC) approach provides a level of security on a network level, in which access to particular resources on a protected network is controlled. This approach is optionally used in conjunction with other access control methods disclosed herein. For example, NAC may be used to control access to a particular resource including secure customer data and query filtering used to control access to particular data records within a database.

In some embodiments, Gatekeeper 125 is configured to facilitate both automatic and manual authentication. For example, Gatekeeper 125 may first automatically authenticate Access Device 110A and then provide questions to manually authenticate a customer using Access Device 110A.

Following authentication of a member of Access Devices 110 and/or a particular customer, access rights are granted. These access rights can include, for example, the right to access secure customer data associated with a particular customer, the customer being previously associated with the member of Access Devices 110. The access rights can include permission to discuss the secure customer data with the customer. In some embodiments, the granted access rights are transferrable. For example, if a telephone call or chat session is transferred from one customer service agent to another customer service agent, some or all of the granted rights may also be transferred. In some embodiments, manual authentication of a customer occurs once per communication session and memory of that authentication is transferred between customer service agents, while automatic authentication of the member of Access Devices 110 used by the customer is repeated for every customer service agent involved in the communication session. Both manual and automatic authentication is optionally applied to a communication session in a layered approach. The manual and automatic authentication may be applied in parallel or serially.

Some embodiments of Customer Communication System 100 further include an Advertising Server 130. Advertising Server 130 is optionally part of CRM System 120 and includes memory configured to store advertisements and logic configured to select advertisements for delivery to members of Access Devices 110. For example, Advertising Server 130 may include a database of advertisements and a microprocessor configured using computing instructions to select advertisements from the database. The selection of advertisements is optionally based on information that is only available after a source of a customer service request has been authenticated. For example, an advertisement may be selected based on an account balance, credit card, debit card or checking transaction history, history of service requests, and/or the like.

Figure 2:
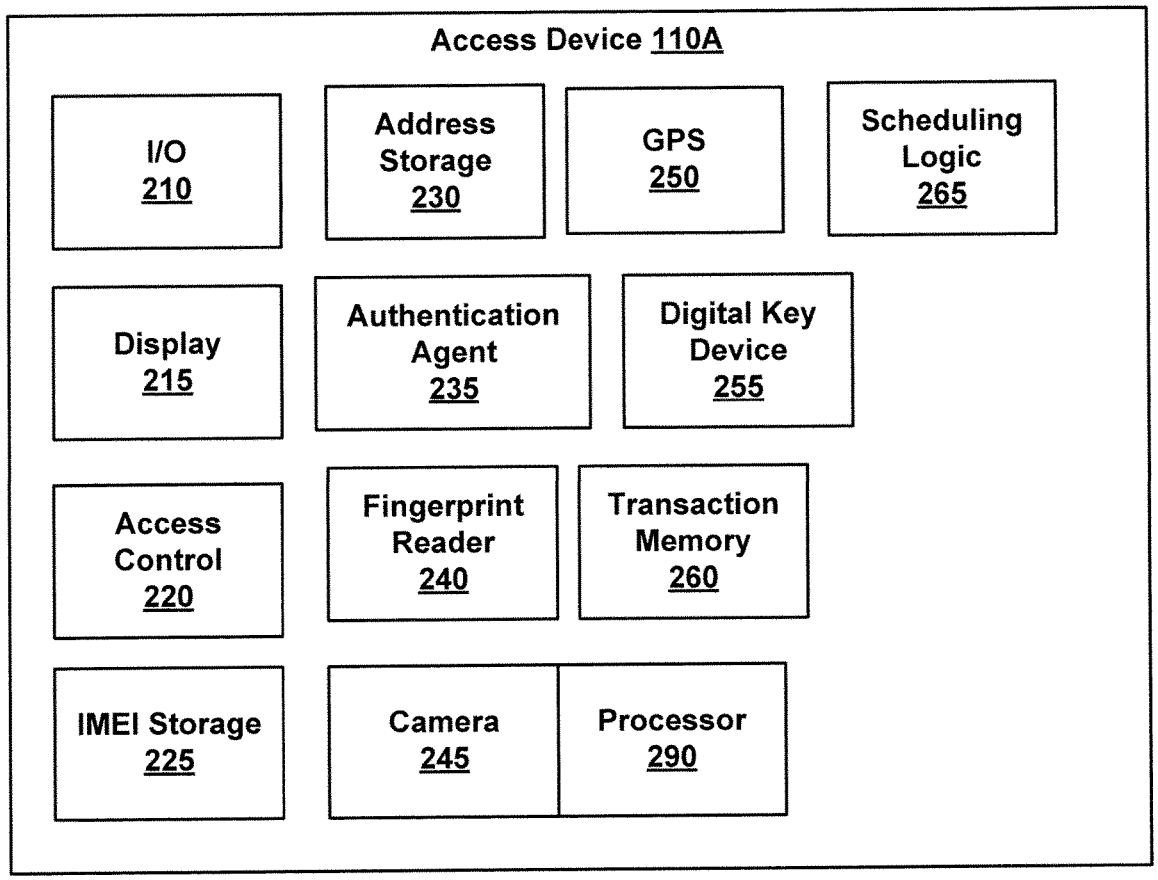
FIG. 2 illustrates further details of an access device, according to various embodiments of the invention.

FIG. 2 illustrates further details of Access Device 110A, according to various embodiments of the invention. Access Device 110A can include a wide variety of devices such a personal computer, smartphone, tablet device, wearable device, a kiosk, or the like. In some embodiments, components disclosed as being included in Access Device 110A are provided as part of an SDK (Software Development Kit) for third party implementation. For example, a business may use the SDK to add the disclosed components to their propriety mobile application. Access Device 110A includes an I/O 210 configured for communicating with external devices via Network 115. I/O 210 may comprise an antenna and circuit configured to communicate via Bluetooth, WiFi, GSM, CDMA, or other wireless communication standard. I/O 210 may comprise a wired communication port such as a USB, FireWire, or Ethernet port, and/or the like. One example of I/O 210 includes the wireless antenna and communication circuits in a mobile phone.

Access Device 110A further includes a Display 215 configured to display a user interface to a user of Access Device 110A. Display 215 includes a touch screen, projector, computer screen, phone screen, and/or the like. Display 215 may be built into or attached to Access Device 110A as an accessory. Examples of Display 215 include a computer monitor attached to a personal computer, a built-in monitor of a laptop or tablet computer, a mobile phone screen and a head-mounted display of a pair of smart glasses. Display 215 is optionally connected to other parts of Access Device 110A by a wireless connection.

Access Device 110A optionally includes an Access Control 220. Access Control 220 includes logic configured to restrict access to functions of Access Device 110A. Access Control 220 can include, for example, the logic that requires a personal identification number (PIN) be entered on a mobile phone or the logic that requires that a password be provided to log into an account on a personal computer. Implementations and structures of such logic are well known in the art. When present, Access Control 220 provides a first step in an authentication process by requiring that a user provide their password or PIN, etc. This step provides assurance that the user of Access Device 110A is authorized to at least access functions on Access Device 110A.

Access Device 110A optionally includes one or more unique device identifiers. These identifiers can be used to positively identify Access Device 110A. In some embodiments, the unique identifiers are stored in an IMEI Storage 225. IMEI Storage 225 includes a memory location configured to store an International Mobile Equipment Identity number or Mobile Equipment ID, or a mobile phone number. In some embodiments, the unique identifiers are stored in an Address Storage 230. Address Storage 230 includes memory configured to store a MAC address, an internet protocol address, an Ethernet address, a network address, and/or the like. Address Storage 230 is optionally further configured to store a temporary session identifier for use in a particular communication session. This session identifier may be used to re-authenticate Access Device 110A during the particular communication session. For example, a session identifier is optionally configured for use in automatically reauthorizing a session as a telephone call or text session is passed from a first service agent to a second service agent.

Access Device 110A further includes an Authentication Agent 235. Authentication Agent 235 is configured to facilitate client-side processes in support of manual and/or automatic authentication of Access Device 110A. For example, in some embodiments, Authentication Agent 235 is configured to receive an authentication request from a CRM System 120A and to automatically provide digital identification data in response to this request. The digital identification data may be provided to CRM System 120A and/or GateKeeper 125. The digital identification data may include one of the unique identifiers stored in Address Storage 230 and/or IMEI Storage. For example, the digital identifier may include a MAC address or an IMEI number. Authentication Agent 235 is optionally configured to post a message on Display 215 requesting that a user provide a password, PIN, fingerprint, image, and/or the like.

In various embodiments, the digital identification data includes information provided by a user of Access Device 110A. For example, the provided information may include a fingerprint of the user obtained using a Fingerprint Reader 240. Fingerprint Reader 240 is configured to scan a user's finger print and generate digital data representing the fingerprint in real-time. Fingerprint Reader 240 is optionally also part of Access Control 220. Examples of Fingerprint Reader 240 are found in mobile phones and personal computers, where they are used for login. In another example, the digital identification data includes information provided by a user using a Camera 245. This information can include a photograph of the user or a video of the user. In some embodiments, this information is assured to be in real-time. For example, the video of the user can be assured to be a current video by requiring that the user respond in real-time to requests or instructions from Access Device 110A. The user may be requested to make certain motions or say certain words.

In various embodiments, the digital identification data provided by Authentication Agent 234 includes information generated using a global positioning system (GPS) 250. GPS 250 includes a GPS receiver and a circuit configured to determine a location based on the timing of signals received at the receiver. Such GPS structures are well known to be included in, for example, mobile phones.

In various embodiments, the digital identification data provided by Authentication Agent 234 includes information received from a Digital Key Device 255. Digital Key Device 255 is a physical device configured to store or generate a digital key. The digital key is optionally generated as a function of time based on an initial seed value. Digital Key Device 255 is optionally a dongle configured to be physically and removably attached to Access Device 110A. Alternatively, Digital Key Device 255 optionally includes a Bluetooth device configured to connect wirelessly to Access Device 110A via a secure Bluetooth connection. In an illustrative example, Digital Key Device 255 is a Bluetooth enabled device including a circuit configured to generate a time dependent key. When an authentication request is received from CRM System 120A, Authentication Agent 235 may be configured to automatically look for Digital Key Device 255 connected to a Bluetooth port of Access Device 110A. If Digital Key Device 255 is found, then an (optionally time dependent) key is retrieved from the found Digital Key Device 255 by Authentication Agent 235 and automatically provided in response to the authentication request. If then proper Digital Key Device 255 is not found, then a default (generic) key may be provided. This default key typically will not be sufficient to achieve device authentication.

In some embodiments, part of GateKeeper 125 is included in Access Control 220. For example, in response to an authentication request, Authentication Agent 235 may be configured to send a request for a password, PIN or fingerprint scan to an API of Access Control 220. Access Control 220 receives this request, displays the request on Display 215 and receives a password, fingerprint scan or PIN from the user. The received fingerprint scan or PIN is then ratified by comparison with a fingerprint data or a PIN previously stored on Access Device 110A. Access Control 220. The logic used for this ratification may be considered a local part of GateKeeper 125 and is optionally the same logic used to log into Access Device 110A. If the ratification is successful then Authentication Agent 235 communicates this success to CRM System 120A in the form of a ratification token such as a confirmation variable or time dependent key. This is an example of ratification occurring on Access Device 110A, rather than elsewhere on Customer Communication System 100.

In some embodiments, Authentication Agent 235 includes logic configured to generate a rolling code and/or a time dependent key, based on a seed value. Such logic is available in a variety of access control systems, and is known to one of ordinary skill in the art.

An authentication request received from CRM System 120A typically includes an identifier of CRM System 120A and/or of GateKeeper 125. This identifier may be used as an address for responding to the request, or may be used to determine a type of authentication desired. For example, an authentication request received from CRM System 120A may include a network address of CRM System 120A and/or a network address of GateKeeper 125. In one embodiment, Authentication Agent 235 receives this information and based on the network address of CRM System 120A determines that authentication requires fingerprint data. Authentication Agent 235 obtains the required fingerprint data using Fingerprint Reader 240 and then uses the network address of GateKeeper 125 to automatically send the required fingerprint data to GateKeeper 125. As discussed elsewhere herein, GateKeeper 125 is configured to compare the fingerprint data with data previously stored in association with a particular account and to grant authorization for a customer service agent at CRM System 120A to access secure customer data, if the fingerprint data matches the previously stored data.

Access Device 110A optionally further includes Transaction Memory 260. Transaction Memory 260 includes physical digital memory and a data structure configured to store a record of transactions made between Access Device 110A and members of CRM Systems 120. This record can include details of customer support sessions, products or services acquired during the support sessions, recommendations made by service agents, sales of products or services, and/or the like.

In some embodiments, the transactions stored in Transaction Memory 260 are used, by Advertising Server 130, to select advertisements to be presented on Display 215. This selection may also be based on a time, a location of Access Device 110A, and/or a user's account information (age, gender, zip code, income, etc.). The selection of an advertisement is optionally performed on a device external to Access Device 110A. For example, the transactions and a current location may be sent to Advertising Server 130 via Network 115. An advertisement selected based on this information is then provided to Access Device 110A for display on Display 215. Authentication Agent 235 is optionally configured to display the advertisement when a service request is made. The advertisement may also be selected based on whom the service request is made to (e.g., CRM System 120A or CRM System 120B).

In an optional Call Back Step 413, a "call back" is received at Access Device 110A from CRM System 120A. Call Back Step 413 is not needed, for example, when a customer service agent is immediately available at CRM System 120A. The call back may occur at a scheduled time or when the next customer service agent is available.

Access Device 110A optionally further includes Scheduling Logic 265. Scheduling Logic 265 is configured to facilitate scheduling a call back from CRM System 120A to Access Device 110A. Such a call back may be desirable when a customer service agent is not immediately available. In some embodiments, Scheduling Logic 265 is configured to show an estimated wait time before a customer service agent is expected to be available and to provide the customer with an option of scheduling an appointment at a later time.

Scheduling Logic 265 is configured to communicate with CRM System 120A and to receive information regarding expected availability times for customer service agents. These times may be expressed as absolute times (e.g., 3:35 PM EST) or relative times (e.g. in 20 min). Several alternative times may be provided and presented to a user as a list on Display 215 or audibly. In some embodiments, Scheduling Logic 265 is configured to automatically receive a user's calendar data, such as Apple Calendar, Microsoft Outlook or Google Calendar data. Scheduling Logic 265 then uses the calendar data to identify call back times at which the user is free (i.e., not scheduled for something else). In alternative embodiments, the calendar data is communicated to CRM System 120A and the comparison made there. Scheduling Logic 265 is optionally configured to add the call back to the user's calendar as a scheduled event.

The availability of customer service agents for call back is optionally dependent on subject matter of the customer service request. For example, a request for technical assistance may be scheduled only with customer service agents qualified to support such requests. The availability of customer service agents for call back may also be dependent on scheduled work breaks (of the agents), other scheduled call backs, the number of agents expected to be available at that time, availability of agents who previously engaged with the user, language, and/or the like. For example, a user may request a call back from the agent who previously helped them, or may request an agent that speaks Spanish.

Access Device 110A further includes a Processor 290. Processor 290 is a digital microprocessor configured to execute computer instructions within Access Device 110A. For example, Processor 290 is typically configured to execute at least part of Authentication Agent 235 and/or Scheduling Logic 265.

Authentication Agent 235 includes hardware, firmware and/or software stored on a non-transient computer readable medium. For example, in some embodiments, Authentication Agent 235 includes a software application downloaded and installed on Access Device 110A. More specifically, Authentication Agent 235 may include an application downloaded onto a smart phone or other mobile device. Authentication Agent 235 is optionally configured to encrypt the digital identification data such that the digital identification data is communicated to CRM System 120A and/or GateKeeper 125 in an encrypted form.

Figure 3:
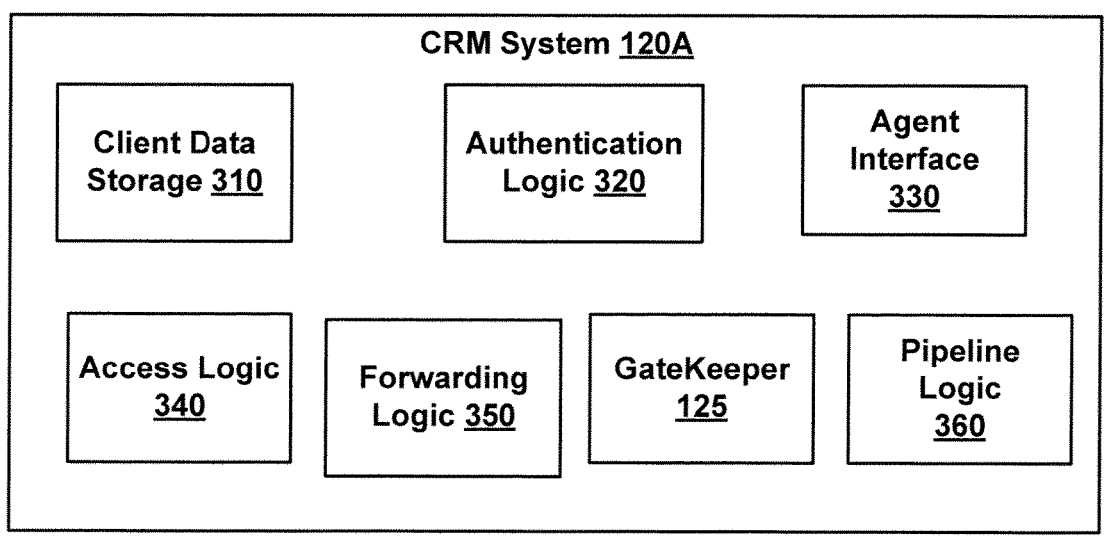
FIG. 3 illustrates further details of a customer relationship management system, according to various embodiments of the invention.

FIG. 3 illustrates further details of Customer Relationship Management (CRM) System 120A, according to various embodiments of the invention. CRM System 120A may be part of an enterprise computer system configured for management of call centers. This enterprise system are optionally cloud based (e.g., Software as a Service—SaaS) and can include features such as call routing, call queuing, service agent interfaces and access to client data. CRM System 120A comprises one or more computing devices and is optionally distributed among multiple locations. As discussed elsewhere herein, GateKeeper 125 is optionally disposed within CRM System 120A, and this instance of GateKeeper 125 may be configured to additionally support CRM System 120B. In alternative architectures, each of CRM Systems 120 may include their own instance of GateKeeper 125, or a GateKeeper 125 (external to any of CRM Systems 120) may be configured to support multiple CRM Systems 120.

CRM System 120A further includes a Client Data Storage 310 configured to store client data. This client data can include secure customer data and/or less-secure customer data. The secure customer data is typically stored in relation to particular accounts and can include information such as account numbers, balances, transaction authorization keys, customer history, orders, medical information, social security numbers, etc. Client Data Storage 310 includes a physical computer readable storage media such as a hard drive or optical drive. Client Data Storage 310 may also include a relational database and a database management system. The database management system is optionally configured to require keys confirming authentication before some secure customer data can be retrieved. In some embodiments, Client Data Storage 310 is remote relative to one or more other parts of CRM System 120A and/or is accessible via Network 115 or a private communication network.

CRM System 120A further includes Authentication Logic 320 configured to authenticate a source of a customer service request, e.g., to authenticate Access Device 110A. Authentication Logic 320 is configured for this task by including logic to, for example, receive a customer service request from Access Device 110A, determine that the customer service request may require access to secure customer data, send a authentication request for digital identification data to Access Device 110A, receive the requested digital identification data and forward the digital identification data to GateKeeper 125. As discussed elsewhere herein, GateKeeper 125 is configured to ratify the digital identification data by comparing the received digital identification data and previously stored customer authentication data, and based on this comparison approve or disallow the authentication of Access Device 110A. The authentication is typically associated with a particular account and secure customer data within that account. In some embodiments, Access Device 110A must have previously been registered as an authorized access device for the particular account. If the authentication is approved, the approval is communicated to Authentication Logic 320.

The authentication may be communicated to Authentication Logic 320 by setting of a flag, providing an access key, providing query access to Client Data Storage 310, returning a variable indicating success, and/or the like. In some embodiments, once Access Device 110A is authenticated for a particular communication session it is assigned a session identifier (ID). The session ID includes a value that may be used to automatically re-authenticate Access Device 110A if the connection between Access Device 110A and a first service agent on CRM System 120A is transferred to a second (or additional) service agent on CRM System 120A. The session ID is optionally provided to Authentication Agent 235 for this purpose. Typically, once the communication session is concluded privileges of the session ID are cancelled such that it cannot be reused to authenticate any of Access Devices 110.

In some embodiments, Authentication Logic 320 is configured to authenticate one of Access Devices 110 using at least two methods. A first of these methods optionally being a "manual" method involving a service agent. For example, in the manual method Authentication Logic 320 may provide the service agent a series of questions to be asked by the service agent and to be answered by a user of Access Device 110A. The answers provided by the user are then compared to answers to the questions previously provided by the user or to data the user should have knowledge of. This comparison can be made by the service agent or by Authentication Logic 320. A second of these methods is, as discussed elsewhere herein, by providing digital identification data received from the one of Access Devices 110 to GateKeeper 125 and automatically receiving a ratification of the digital identification data from GateKeeper 125. The two methods of authenticating one of Access Devices 110 can be applied in parallel or serially.

CRM System 120A further includes one or more Agent Interface 330. Agent Interface 330 includes logic configured to generate and operate a graphical user interface having fields for presenting data to a customer service agent, and for the customer service agent to enter commands. The graphical user interface is optionally based on HTML or similar language. In some embodiments, Agent Interface 330 is configured to visually mark data secure customer data that is not authorized for communication to a user of Access Device 110A. Once Access Device 110A is authenticated for a particular communication session, the visual markings on the secure customer data may be removed as an indication to the customer service agent that the data can be discussed with the user of Access Device 110A. Note that, while the examples presented herein discuss granting or not granting a customer service agent access to secure customer data. In alternative embodiments, the customer service agent may have access to this data by default and what is granted or not granted is permission for the customer service agent to communicate this data to a member of Access Devices 110. The examples provided are intended to apply to both granting of access and granting of permission.

CRM System 120A optionally further includes Access Logic 340. Access Logic 340 is configured to provide members of Access Devices 110 to secure customer data after the members have be authenticated as discussed herein. For example, in some embodiments, Access Logic 340 may be configured to share a view of secure customer data on both Agent Interface 330 and Access Device 110A. While screen or data sharing technology is well known, Access Logic 340 is distinguished by being responsive to whether Access Device 110A has been authenticated for a particular communication session. For example, Access Logic 340 may include computing instructions configured to block access (from Access Device 110A) to secure customer data or to a view of this data until Access Device 110A has been authenticated.

CRM System 120A optionally further includes Forwarding Logic 350. Forwarding Logic 350 is configured to transfer a communication session from a first customer service agent to a second customer service agent. For example, a user of Access Device 110A may be communicating with the first customer service agent and the first customer service agent wishes to transfer the user to the second customer service agent (or add the second customer service agent for a 3-way communication session). Once the second customer service agent is in communication with Access Device 110A, Access Device 110A can be automatically re-authenticated using Authentication Logic 320 and GateKeeper 125. This re-authentication is optionally based on a session ID. In some embodiments, Forwarding Logic 350 is configured to communicate the session ID to the second customer service agent, where it can be used for authentication be comparing with a copy of the session ID stored on Access Device 110A.

CRM System 120A optionally further includes Pipeline Logic 360. Pipeline Logic 360 is configured to manage queues (pipes) of customer service requests and the availability of customer service agents. Queues of customer service requests may be general or presorted. Presorted Queues include customer service requests that satisfy criteria of the presorted queue. For example, a presorted queue may include request related to specific subject matter, requiring a Spanish speaking customer service agent, or requests assigned to a specific customer service agent. Customer service request may be placed in a specific presorted queue based on multiple criteria. One or more customer service agents may be assigned to a specific queue.

Pipeline Logic 360 is optionally configured to calculate estimates of customer service agent availability. These estimates may include when any agent or a specific agent will next be available, estimates of how long waits are in a queue, how many agents will be available at a specific time, when any agent assigned to a specific queue will available, times for which calls can be scheduled, and/or the like. For example, Pipeline Logic 360 may be configured to provide to Scheduling Logic 265 an estimated wait time before a customer service agent is expected to be available in response to a customer service request and/or to provide information regarding expected availability times for customer service agents. This information may be used to schedule call backs. The scheduling may be performed by Scheduling Logic 265 on Access Device 110A or by Pipeline Logic 360 on CRM System 120A. Further details of Pipeline Logic 360 are discussed elsewhere herein.

CRM System 120A typically further includes a microprocessor (not shown) configured by the addition of computing instructions to execute Authentication Logic 320, Forwarding Logic 350 and/or Pipeline Logic 360.

Figure 4:
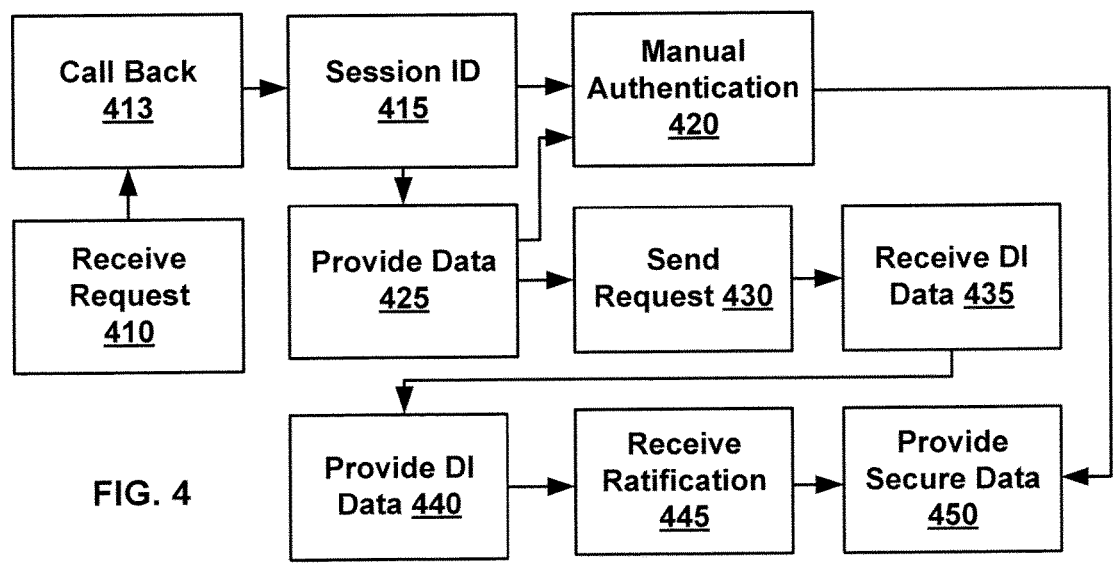
FIG. 4 illustrates a method of managing a customer service request, according to various embodiments of the invention.

FIG. 4 illustrates methods of managing a customer service request, according to various embodiments of the invention. In these methods automatic authentication of an access device, e.g., Access Device 110A, is achieved by receiving digital identification data from the access device and ratifying the digital identification data using GateKeeper 125. Following authentication of the access device, access and/or use of secure customer data is enabled. The methods illustrated in FIG. 4 are optionally performed using CRM System 120A and GateKeeper 125.

In a Receive Request Step 410, a request to communicate is received at CRM System 120A from Access Device 110A. This request may be in the form of a phone call, an internet chat session (voice, video and/or text), and/or the like. The request is optionally generated by an application on Access Device 110A. This application (e.g., Authentication Agent 235) may be configured to communicate both voice and digital data, e.g., to CRM System 120A. In some embodiments, the request In an optional Call Back Step 413, a "call back" is received at Access Device 110A from CRM System 120A.

Call Back Step 413 is not needed, for example, when a customer service agent is immediately available at CRM System 120A. The call back may occur at a scheduled time or when the next customer service agent is available. Whether a call back is required or not, associated data and voice channels are opened between Access Device 110A and CRM System 120A. These channels are associated in that the endpoints for each are fixed and changes in these endpoints can only be changed under the control of CRM System 120A (e.g., by Authentication Logic 320 or Forwarding Logic 350). A customer service agent communicating with a user of Access Device 110A is assured that the voice and data channels both originate at the same Access Device 110A—such that authentication over the data channel can be used to authorize communication over the voice channel. Call Back Step 413 is optionally facilitated by Scheduling Logic 265 and Pipeline Logic 360.

In an optional Session ID Step 415, a session ID is assigned to the request to communicate, e.g., to the communication session. The session ID typically includes a temporary value that expires when the communication session is terminated. In Session ID Step 415 the assigned session ID is optionally communicated to Access Device 110A.

In an optional Manual Authentication Step 420, Access Device 110A and/or a user of Access Device 110A is authenticated by a customer service agent. This authentication may be accomplished by the customer service agent asking the user one or more questions. Manual Authentication Step 420 is optionally performed in parallel to or prior to automated authentication of Access Device 110A. For example, Manual Authentication Step 420 may be performed in parallel with Steps 425-445 discussed below.

In an optional Provide Data Step 425, less secure or unsecured customer data is provided to Access Device 110A and/or to a customer service agent. This data includes information that does not require authentication of the Access Device 110A or the user thereof. For example, Provide Data Step 425 may include providing a customer name, account number and address to a customer service agent. Provide Data Step 425 may also include providing questions to the customer service agent, the questions being configured for manual authentication of the customer.

In an optional Send Request Step 430, a request for digital identification data is automatically sent to Access Device 110A. Send Request Step 430 is optional when the digital identification data is received along with the request in Receive Request Step 410. At Access Device 110A, this request is typically received by Authentication Logic 320.

In a Receive DI Data Step 435, the requested digital identification data is received at CRM System 120A or GateKeeper 125 from Access Device 110A. As noted elsewhere herein, the requested digital identification data may include biometric data, a unique device identifier, a password/PIN, and/or the like. The digital identification data optionally includes a combination of these data types to achieve multi-factor authentication. The digital identification data is optionally received in an encrypted form.

In a Provide DI Data Step 440, the digital identification data received in Receive DI Data Step 435 is provided to GateKeeper 125 for ratification. In embodiments wherein GateKeeper 125 is within CRM System 120A, Provide DI Data Step 440 may merely include transfer of the data between subroutines.

In a Receive Ratification Step 445, a ratification of the digital identification data is received from GateKeeper 125. This ratification completes an authentication of Access Device 110A. Note that if a ratification occurs on Access Device 110A using Access Control 220, then Receive DI Data Step 435 and Provide DI Data Step 440 are optional. The ratification received in Receive Ratification Step 445 is received from Authentication Agent 235 and may be based on a ratification performed by Access Control 220.

In a Provide Secure Data Step 450, secure customer data is provided to Access Device 110A and/or Agent Interface 330. Note that Provide Secure Data Step 450 can occur after either manual or automated authentication of Access Device 110A. Some embodiments require both manual and automated authentication prior to granting access to particularly secure customer data. In some embodiments automated authentication of Access Device 110A is achieved before an agent is included in the communication. In these embodiments, the agent need not spend time on authentication processes or may merely activate an authenticate request command.

Figure 5:
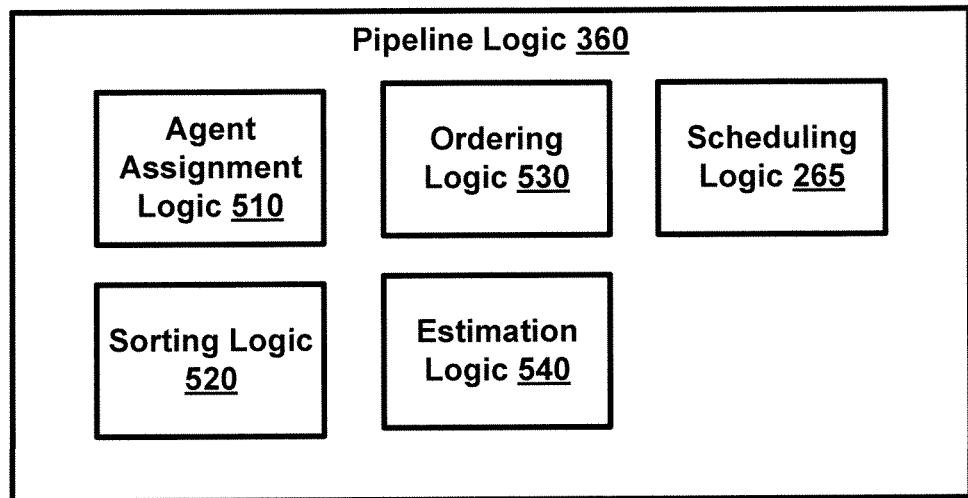
FIG. 5 illustrates further details of pipeline logic, according to various embodiments of the invention.

FIG. 5 illustrates further details of Pipeline Logic 360, according to various embodiments of the invention. Pipeline Logic 360 is distinguished, in part, by the ability to authenticate Access Devices 110 before the service request is received by a customer service agent. This authentication provides additional information that can be used to manage customer service requests. For example, the authentication can be used to automatically retrieve user account information, a call back number, a user's service history, a user's calendar, and/or the like. The operation and functionality of Pipeline Logic 360 is described with reference to FIG. 6.

Figure 6:
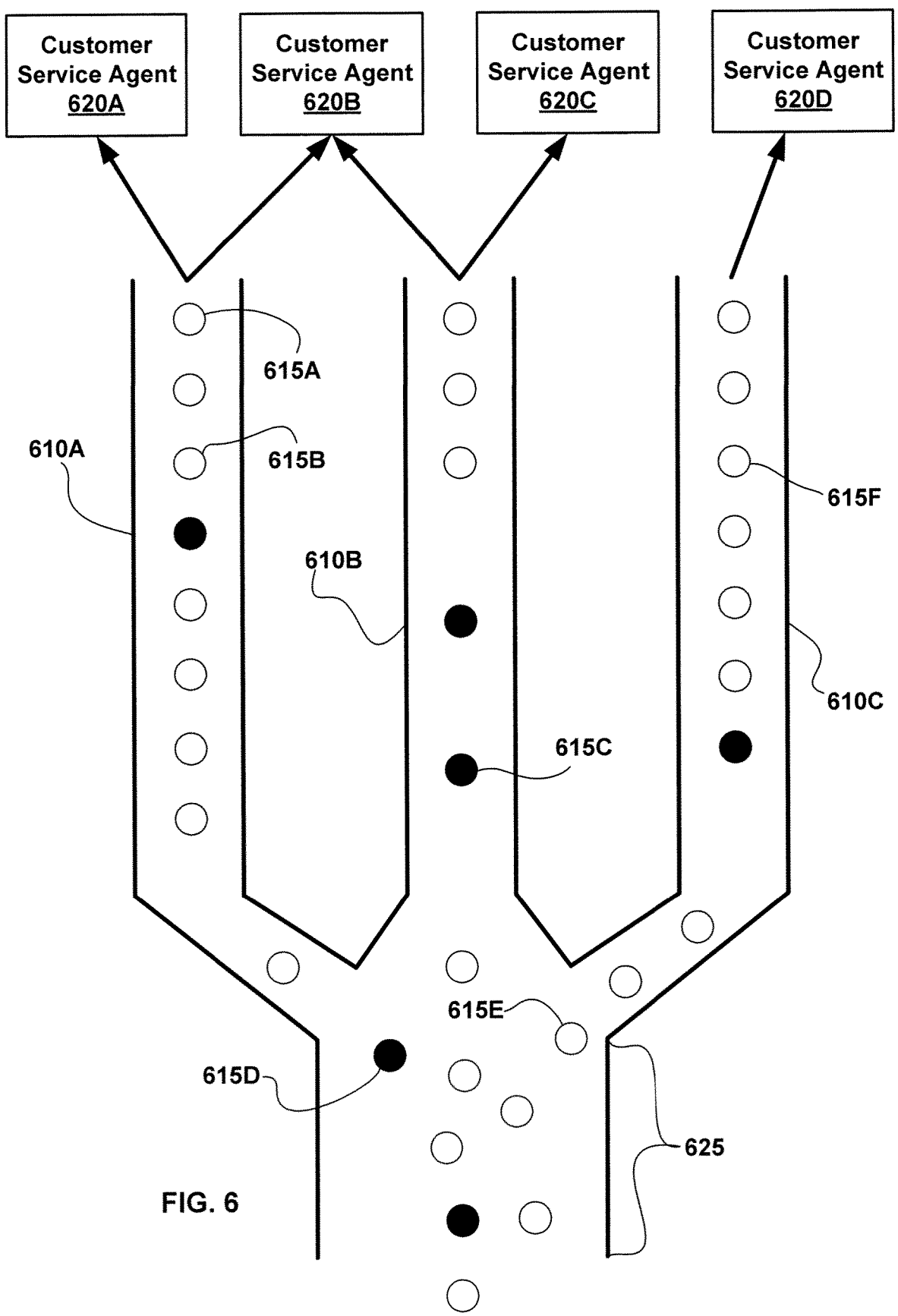
FIG. 6 illustrates request pipelines, according to various embodiments of the invention.

FIG. 6 illustrates Request Pipelines 610, according to various embodiments of the invention. Request Pipelines 610 are virtual representations of lists of Customer Service Requests 615 (individually designated 615A, 615B, etc.) Each of Request Pipelines 610 is assigned to one or more Customer Service Agents 620 (individually designated 620A, 620B, etc.) Customer Service Requests 615 are received at a Triage Zone 625 of Request Pipelines 610, from which they are sorted in to specific members of Request Pipelines 610. Request Pipelines are individually designated 610A, 610B, etc. Request Pipelines 610 and Triage Zone 625 are virtually representations of the processing of Customer Service Requests 615. In actual practice the Customer Service Requests 615 include data structures and data characterizing each request. The position of an individual member of Customer Service Requests 615 within the virtual structures illustrated in FIG. 6 can be represented by an ordered set of pointers, tags indicative of order, memory location, and/or the like. For example, the location of Customer Service Request 615F in FIG. 6 may represent a data tag indicating that it has been assigned to Request Pipeline 610C and a pointer indicating that it is in the third position within this queue. Customer Service Agents 620 represent human service agents and/or their respective computing devices. Typical embodiments include a greater number of Customer Service Requests 615, Request Pipelines 610 and Customer Service Agents 620 than are illustrated in FIG. 6.

Referring to FIGS. 5 and 6, Pipeline Logic 360 includes Agent Assignment Logic 510. Agent Assignment Logic 510 is configured for assigning Customer Service Agents 620 to members of Request Pipelines 610. To accept Customer Service Request 615, each of Request Pipelines 610 has at least one Customer Service Agent 620 assigned. As illustrated a member of Request Pipelines 610 may have one, two or more Customer Service Agents 620 assigned thereto. A particular member of Customer Service Agents 620 may be assigned to more than one of Request Pipelines 610.

In some embodiments, Agent Assignment Logic 510 is configured to dynamically assign Customer Service Agents 620 to Request Pipelines 610 in response to profiles of the Customer Service Agents 620 and the real-time status of Request Pipelines 610. This assignment can include the creation (allocation) and destruction (deallocation) of Request Pipelines 610. Examples of the criteria that may be used to select Customer Service Agent 620B for assignment to Request Pipelines 610A or 610B include: load balancing, workday schedule (e.g., breaks and time on/off) of Customer Service Agent 620B, skills and/or expertise of Customer Service Agent 620B, classification of the Request Pipelines 610A or 610B, number of scheduled Consumer Service Requests 615 (scheduled call backs) assigned to Customer Service Agent 620B, other Customer Service Agents 620 available, and/or the like. For example, Customer Service Agent 620B may be authorized to reset passwords for online customers and may be assigned to Request Pipeline 610A because it is classified to include password requests. Customer Service Agents 620B may be assigned to Request Pipelines 610 automatically or manually.

Pipeline Logic 360 typically further includes Sorting Logic 520. Sorting Logic 520 is configured to receive Customer Service Requests 615 and assign these requests to specific members of Request Pipelines 610. Typically, each of Customer Service Requests 615 is assigned to a single one of Request Pipelines 610 on a 1-to-1 basis. The assignment of Customer Service Requests 615 is based, at least in part, on the classification of each of Request Pipelines 610. Request Pipelines 610 are classified by request type. For example, different members of Request Pipelines 610 may be classified as including Customer Service Requests 615 for account balances, for technical service, for password changes, for new accounts, for sales, etc. The purpose of a Customer Service Request 615 may be determined by a source of the request, by the customer selections made in a menu, by data entered on a web page, by parsing narrative text, by a destination address (e.g., URL or telephone number) of the request, and/or the like. A member of Request Pipelines 610 may have multiple classifications. Sorting Logic 520 is typically applied while a request is in the Triage Zone 625 illustrated in FIG. 6.

The assignment of Customer Service Requests 615 to one of Request Pipelines 610 is optionally based on whether the source of the request has been authenticated or not. For example, Request Pipeline 610B may be classified to receive Customer Service Requests 615 from authenticated sources and Request Pipeline 610C may be classified to receive Customer Service Requests 615 from unauthenticated sources. The authentication status of Customer Service Request 615A can change over time. If this occurs, the request may be transferred from one of Request Pipelines 610 to another of Request Pipelines 610.

If the source of Customer Service Request 615D is authenticated, then information regarding the account of a user may be used to assign the request to a specific member of Request Pipelines 610. This information regarding the account may only be available for authenticated sources/users. For example, the financial information or service history of a user may be available after authentication. VIP customers may have access to special Request Pipelines 610. This information can be used by Sorting Logic 520 to assign Customer Service Request 615D to a particular member of Request Pipelines 610. For example, the request may be assigned to a pipeline associated with a Customer Service Agent 620 that the requestor has dealt with previously, a Customer Service Agent 620 qualified to serve customers with an account balance in a certain range, and/or the like.

Pipeline Logic 360 typically further includes Ordering Logic 530. Ordering Logic 530 is configured to manage the order of Customer Service Requests 615 in Request Pipelines 610. For example, Ordering Logic 530 is configured to hand off the Customer Service Requests 615 in a first-in-first-out (FIFO) manner. Exceptions to the FIFO management of requests that are found in various embodiments are: 1) the insertion of scheduled call backs into the Request Pipelines 610; 2) giving priority to Customer Service Requests 615 from automatically authenticated sources; and/or 3) giving priority to transferred Customer Service Requests 615. Ordering Logic 530 is optionally configured to dynamically modify the order of Customer Service Request 615 within Request Pipeline 610. Factors that can be used to determine order include, transferred calls, repeat calls, authentication of source, priority (VIP) customer status, account value, account balance, and/or the like.

A scheduled call-back is scheduled for a specific time or time range. Call-backs are based on Customer Service Requests 615 that are not immediately serviced and requested by the customer to occur at a specific time or within a time range. As noted elsewhere herein, Scheduling Logic 265 may be used to schedule a call-back. In FIG. 6, scheduled Customer Service Requests 615 are indicated by a solid circle while non-scheduled Customer Service Requests 615 are indicated by an open circle. In some embodiments, the source of a Customer Service Request 615 must be authenticated before a call-back can be scheduled.

The authentication of a source of Customer Service Request 615E can occur when Customer Service Request 615E is first received, when Customer Service Request 615E is in Triage Zone 625 and/or when Customer Service Request 615E is in one of Request Pipelines 610. In some embodiments, Customer Service Request 615E may be moved from one of Request Pipelines 610 to another of Request Pipelines 610 based on successful authentication of its source.

Pipeline Logic 360 typically further includes Estimation Logic 540. Estimation Logic 540 is configured to estimate the times that resolution of a Customer Service Requests 615 will take. For example Estimation Logic 540 may estimate that resolution of Customer Service Request 615A will take 5 minutes. The estimation of how long servicing a request will take can depend on the same criteria used to place a request in one of Request Pipelines 610. Further, the estimation may be based on whether or not a source of the Customer Service Request 615 has been authenticated. Typically, requests from authenticated sources are expected to take less time than requests from un-authenticated sources. Further, the estimation may be based on historical request resolution times of a particular member of Customer Service Agents 620. Estimates made by Estimation Logic 540 are used to predict when a particular Customer Service Agent 620 will be available to respond to a scheduled Customer Service Request 615.

Figure 7:
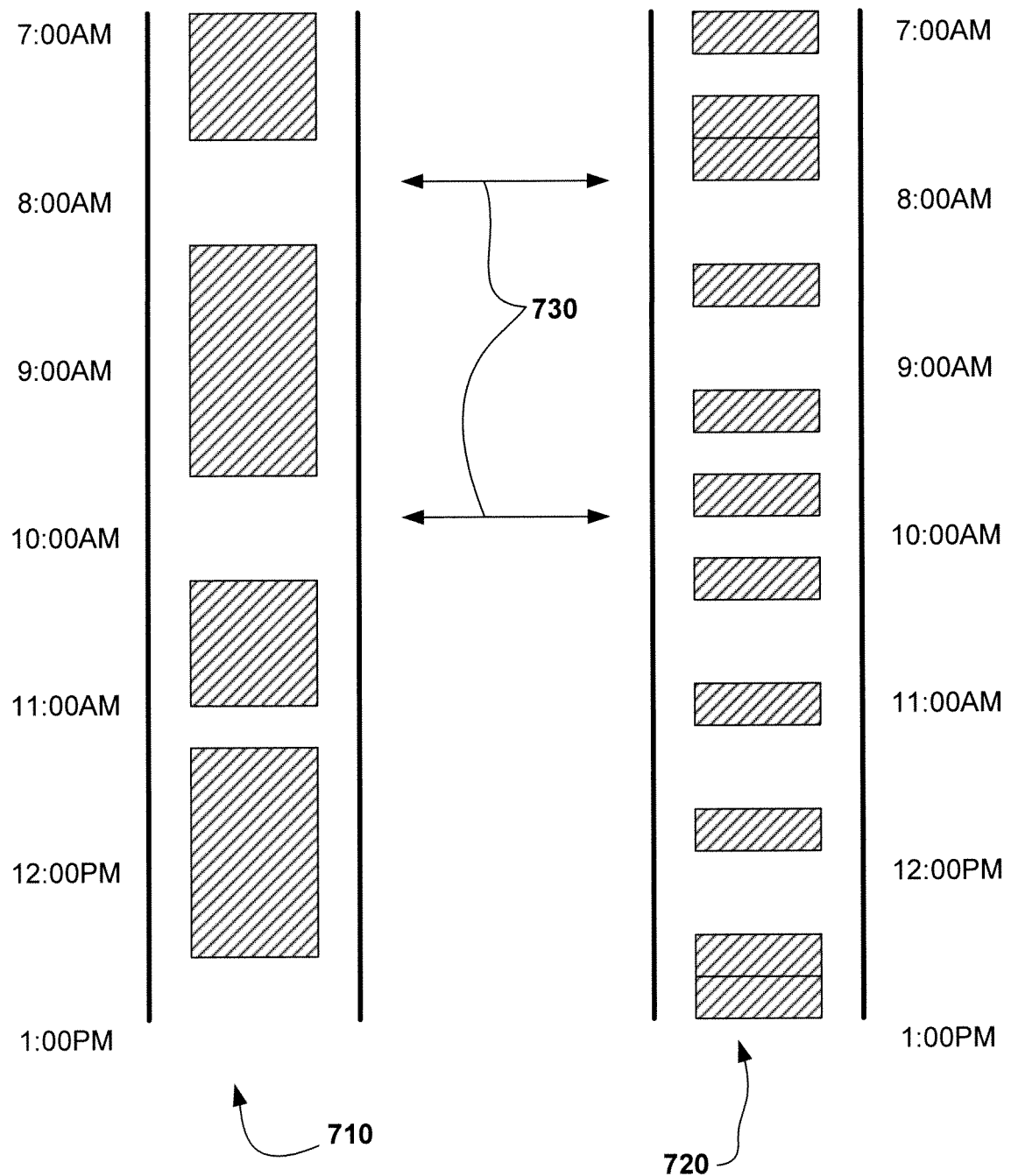
FIG. 7 illustrates schedule matching, according to various embodiments of the invention.

Pipeline Logic 360 typically further includes Scheduling Logic 265. As noted elsewhere herein, Scheduling Logic 265 is configured for scheduling a call-back. This scheduling may be automatic and be based on predicted availability of one or more Customer Service Agents 620A. The operation of Scheduling Logic 265 is illustrated by FIG. 7. FIG. 7 illustrates a Customer Schedule 710 and an Agent Schedule 720. Hash marks are meant to indicate unavailable times. Customer Schedule 710 may be derived from, for example, an outlook or Google calendar of the customer making the Customer Service Request 615. The Customer Schedule 710 may be derived from data retrieved from the source of the request. Agent Schedule 720 is derived from the schedules of one or more Customer Service Agents 620. Unavailable times are those for which no qualified Customer Service Agents 620. The Unavailable times may be based on estimates made using Estimation Logic 540, work schedules, previously scheduled call-backs, and/or the like. Scheduling Logic 265 is configured to automatically identify one or more Common Available Times 730 that are available on both Customer Schedule 710 and Agent Schedule 720. As discussed elsewhere herein, the Common Available Times 730 are optionally presented to the requestor.

Figure 8:
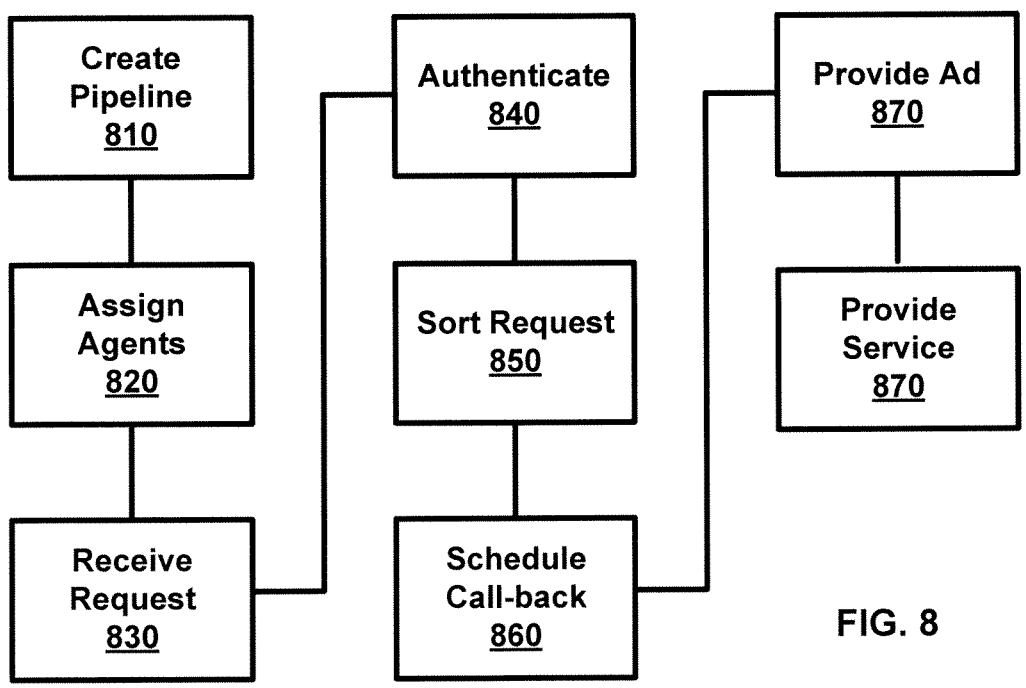
FIG. 8 illustrates methods of managing a customer service request, according to various embodiments of the invention.

FIG. 8 illustrates methods of managing Customer Service Requests 615, according to various embodiments of the invention. These methods may be performed using CRM System 120. The steps illustrated may be performed in a variety of alternative orders.

In a Create Pipeline Step 810 one or more Request Pipelines 610 is created. The created Request Pipelines 610 are each associated with specific characteristics to be used to determine if a specific Customer Service Request 615 should be placed in that Request Pipeline 610. As discussed elsewhere herein, these characteristics can include whether the source of the request has been authenticated, an identity of the customer making the request, data provided by the customer, etc.

In some embodiments, Create Pipeline Step 810 is automatically performed if a Customer Service Request 615 is received that does not match the characteristics of any currently available pipeline. The created Request Pipeline 610 may be represented in CRM System 120 by allocated pointers and/or allocated memory locations. Create Pipeline Step 810 is optional in instances where any needed Request Pipelines 610 are already allocated.

In an Assign Agents Step 820 one or more Customer Service Agents 620 are assigned to the Request Pipelines 610 created in Create Pipeline Step 810. As noted elsewhere herein, this assignment may be based on characteristics of the pipeline, authority, work schedule, and/or workload of the Customer Service Agents 620, number of Customer Service Requests 615 currently pending, etc. Assign Agents Step 820 is optional in embodiments in which Customer Service Agents 620 are previously assigned to current Request Pipelines 610. Assign Agents Step 820 is optionally performed using Agent Assignment Logic 510.

In a Receive Request Step 830 a Customer Service Request 615 is received from one of Access Devices 110. Receive Request Step 830 is an embodiment of Receive Request Step 410. In an Authenticate Step 840 the source of the received Customer Service Request 615 is authenticated. The authentication may be performed as described elsewhere herein, for example, using Access Device 110A, CRM System 120A, and/or the steps illustrated in FIG. 4. Either or both the person (requestor) making the request and the Access Device 110 from which the request is sent may be authenticated.

Sort Request Step 850 the Customer Service Request 615 received in Receive Request Step 830 is assigned to one of Request Pipelines 610. This assignment is based on, for example, whether the request has been authenticated, information provided by the requestor, characteristics of the Request Pipelines 610, and/or any other of the criteria discussed herein. Sort Request Step 850 is optionally performed using Sorting Logic 520. Once placed in one of Request Pipelines 610, the position of the request within the queue is managed using Ordering Logic 530.

In an optional Schedule Call-back Step 860 a call-back for the Customer Service Request 615 is scheduled using Scheduling Logic 265. The scheduling is based on Agent Schedule 720 and optionally on Customer Schedule 710. Schedule Call-back Step 860 may make use of estimates of times required for a Customer Service Agent 620 to answer Customer Service Requests 615. For example, Scheduling Logic 265 may consider how long answering the Customer Service Request 615 for which a call-back is being scheduled will take to assure that the Customer Service Agent 620 is available for enough time. In another example, Scheduling Logic 265 may use an estimate of how long an unscheduled Customer Service Request 615 will take to assure that one of Customer Service Agents 620 is available for a scheduled call-back.

In an optional Provide Ad Step 870 Advertising Server 130 is used to select and provide an advertisement to the source (e.g., member of Access Devices 110) from which the Customer Service Request 615 is received. The selection of the advertisement is optionally based on information available only after the source is authenticated in Authenticate Step 840. For example, the advertisement selection may be based on the balance of a bank account or on a customer service request history of interactions between the source and CRM System 120A. As discussed elsewhere herein, the advertisement may be presented on Display 215. Provide Ad Step 870 optionally occurs while the Customer Service Request 615 is waiting in one of Request Pipelines 610.

In a Provide Service Step 880 the requested customer service is provided to one of Customer Service Agents 620, who then provides the requested service. This step typically occurs when the associated Customer Service Request 615 reaches the final position in one of Request Pipelines 610. As discussed elsewhere herein, the service provided may make use of data available (only) because the source of the request has been authenticated.

Several embodiments are specifically illustrated and/or described herein. However, it will be appreciated that modifications and variations are covered by the above teachings and within the scope of the appended claims without departing from the spirit and intended scope thereof. For example, the "customer service agent" discussed herein could be a "sales agent" or other personnel.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted herein can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The logic discussed herein may include hardware, firmware and/or software stored on a non-transient computer readable medium. This logic may be implemented in an electronic device to produce a special purpose computing system.

What is claimed is:

1. A customer relationship management system comprising:
    a non-transitory medium;
    authentication logic configured to automatically authenticate a source of a customer service request using digital identification data received from the source of the customer service request; and
    pipeline logic stored in the non-transitory medium and including
        agent assignment logic configured to assign a customer service agent to a request queue,
        sorting logic configured to place the customer service request into the request queue, and
        ordering logic configured to maintain an order of customer service requests in the request queue.

2. The system of claim 1, wherein the agent assignment logic is configured to assign the customer service agent based on characteristics used to place customer service requests in the request queue.

3. The system of claim 1, wherein the agent assignment logic is configured to assign the customer service agent to multiple request queues.

4. The system of claim 1, wherein the sorting logic is configured to place the customer service request in the request queue based on the authentication of the source.

5. The system of claim 4, wherein the sorting logic is further configured to place the customer service request in the request queue based on a customer service request history.

6. The system of claim 4, wherein the sorting logic is further configured to place the customer service request in the request queue based on an account balance.

7. The system of claim 1, wherein the ordering logic is configured to move the customer service request from the request queue to another request queue based on authentication of the source.

8. The system of claim 1, wherein the ordering logic is configured to give priority to customer service requests from an authenticated source.

9. The system of claim 1, wherein the pipeline logic further includes estimation logic configured to estimate an amount of time needed to provide a service requested in the customer service request.

10. The system of claim 1, wherein the pipeline logic further includes scheduling logic configured to schedule a call-back in response to the customer service request.

11. The system of claim 1, further comprising an advertising server, the advertising server being configured to select an advertisement based on information available only after the source of the customer is authenticated.

12. The system of claim 1, further comprising an advertising server, the advertising server being configured to select an advertisement based on an account balance of a customer or a customer service request history.

13. The system of claim 1 further comprising agent interface logic configured to visually mark secure customer data that is not authorized for communication and to remove the visual markings upon authenticating the source, wherein the agent interface logic is configured to provide unsecure customer data without authenticating the source and provide the secure data after the source is authenticated.

14. A method of processing a customer service request, the method comprising:
    receiving the customer service request;
    authenticating a source of the customer service request;
    selecting a request queue, from multiple request queues, for placement of the customer service request, the selection being based on the authentication of the source;
    selecting an advertisement based on the authentication of the source; and
    providing the service requested in the customer service request, provision of the service being based on information only available because the source is authenticated.

15. The method of claim 14, wherein the selection of the request queue is based on information available because the source is authenticated.

16. The method of claim 15, wherein the information includes an account balance or a history of service requests.

17. The method of claim 14, wherein the selection of the advertisement is based on information available because the source is authenticated.

18. A customer relationship management system comprising:
    a non-transitory medium;
    authentication logic configured to automatically authenticate a source of a customer service request using digital identification data received from the source of the customer service request, and further configured to determine a type of digital identification data required for authentication based on an identifier included in the customer service request; and
    pipeline logic stored in the non-transitory medium and including
        agent assignment logic configured to assign a customer service agent to a request queue,
        sorting logic configured to place the customer service request into the request queue, and
        ordering logic configured to maintain an order of customer service requests in the request queue.

19. The system of claim 18 wherein the agent assignment logic is further configured to assign the customer service agent to multiple request queues.

* * * * *